Figure 1:
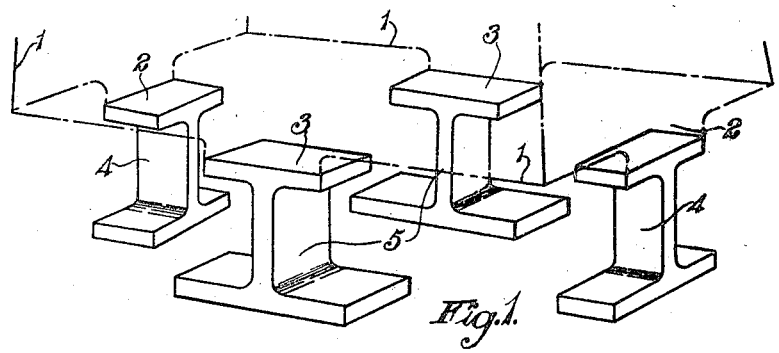

Feb. 26, 1924.  1,484,936

W. ECCLES ET AL

FRAME SUPPORT

Filed Feb. 18, 1922  2 Sheets-Sheet 1

Inventor
William Eccles &
Henry Lewis Guy
By D.C. Davis
Attorney.

Feb. 26, 1924.

W. ECCLES ET AL 1,484,936

FRAME SUPPORT

Filed Feb. 18, 1922    2 Sheets-Sheet 2

Inventor
William Eccles &
Henry Lewis Guy.
By D. C. Davis
Attorney.

Patented Feb. 26, 1924.

1,484,936

UNITED STATES PATENT OFFICE.

WILLIAM ECCLES, OF CHORLTON-CUM-HARDY, AND HENRY LEWIS GUY, OF MANCHESTER, ENGLAND, ASSIGNORS, BY MESNE ASSIGNMENTS, TO WESTINGHOUSE ELECTRIC AND MANUFACTURING COMPANY, A CORPORATION OF PENNSYLVANIA.

FRAME SUPPORT.

Application filed February 18, 1922. Serial No. 537,602.

*To all whom it may concern:*

Be it known that we, WILLIAM ECCLES, a resident of Chorlton-cum-Hardy, in the county of Lancaster, England, and HENRY LEWIS GUY, a resident of Manchester, in the county of Lancaster, England, both subjects of the King of Great Britain, have invented new and useful Improvements in Frame Supports, of which the following is a specification.

This invention relates to means for supporting machines and other structures and has for its object to provide for so supporting such a machine or structure that the movement of the base or floor from which it is supported will not cause a twisting movement of the machine in certain directions.

In marine propulsion, for example, reduction gearing between a steam turbine and the propeller shaft is frequently employed and it is of the utmost importance that the framework for supporting the gear shafts, hereinafter called a gear case, shall not be subject to distortion in directions which would cause the gear shafts to deviate from the parallel condition, since if such deviations occur large increases in the pressure between the teeth of the gears may arise which might result in damage or, in any event, considerable reduction in the safety of the gearing. The gear case or supporting structure for the shafts is necessarily attached to or supported from a floor forming part of the ship's structure through a seat or seatings and movements of the ship's frame are consequently liable to be transmitted to the gear case which would cause a twisting thereof and consequent change in the co-planar or parallel position of the gear shafts. Stresses in the gear case may also be occasioned during the operation known as "chocking-up" in which wedges or packing pieces are driven in between the gear case and the seat or seatings in order to compensate for irregularities in the latter.

In order to avoid the transmission of such twisting stresses to the machine or structure to be supported, such machine or structure is, according to the present invention, flexibly supported at four places which are so disposed that any twist of the supporting floor or foundation around certain predetermined axes will not be transmitted to the machine or structure. The four supporting places are arranged so that two of them are in a line parallel with one of the predetermined axes of twist and the other two are in a line perpendicular to the line joining the first two and located substantially midway between them.

In order that the nature of the invention may be clearly understood various examples will now be described shewing how the same may be carried into effect as applied in supporting the casing of a reduction gear for marine turbines.

Figure 2:
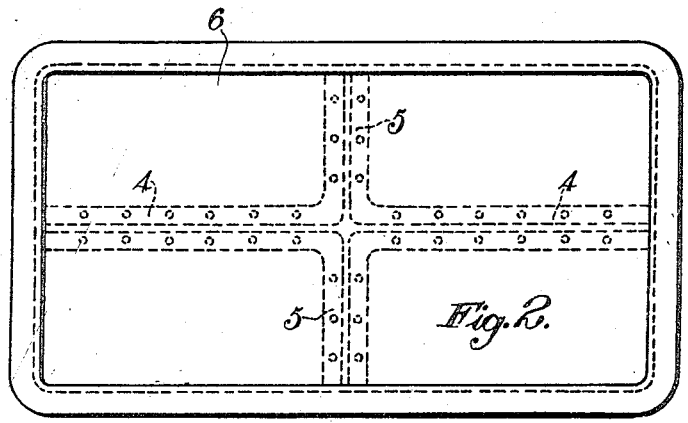
Figure 3:
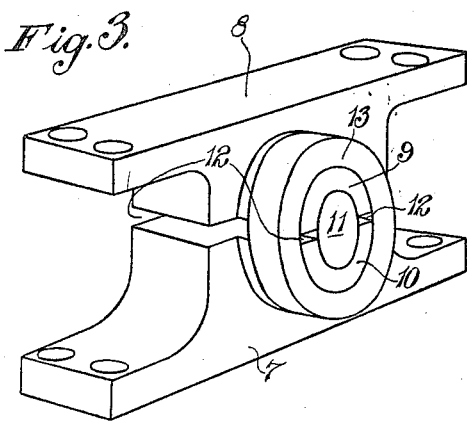
Figure 4:
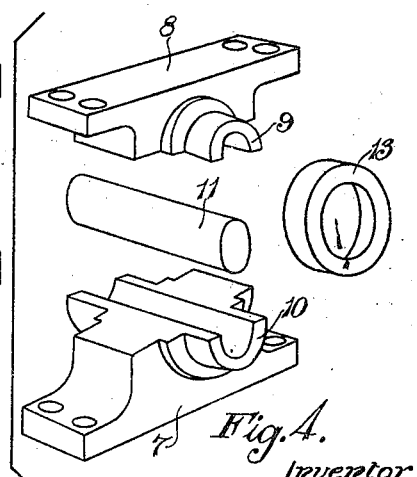
Figure 5:
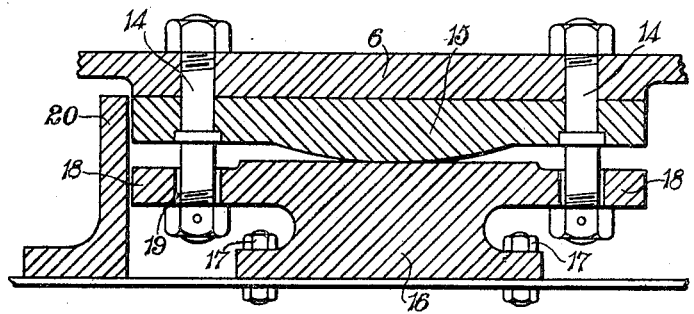
Figure 6:
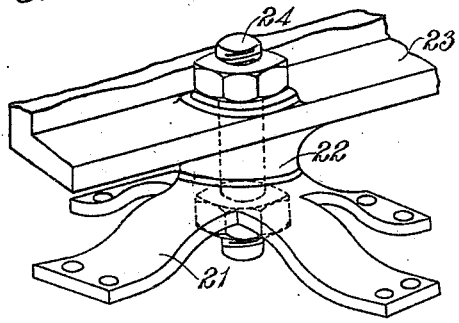
Figure 7:
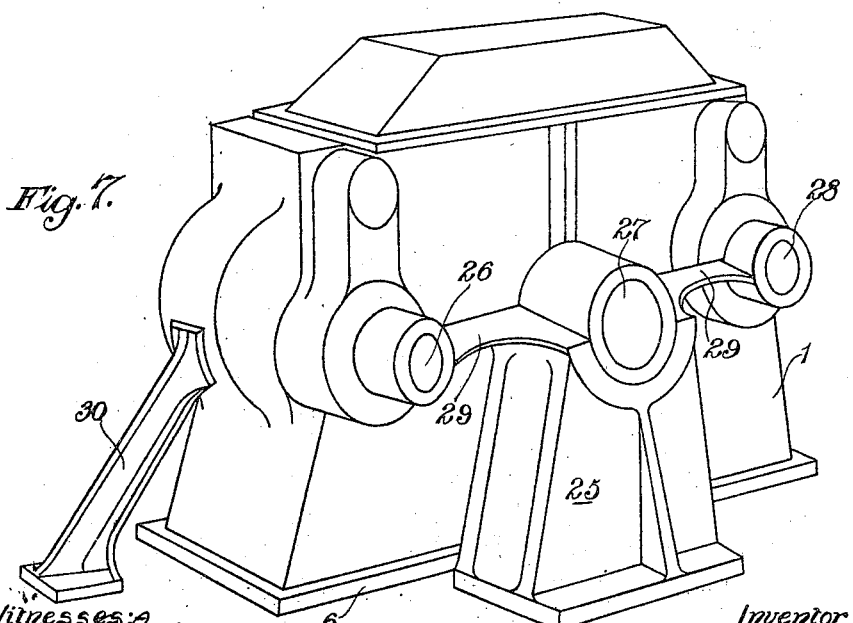

In the accompanying drawings Fig. 1 is a diagrammatic perspective view illustrating one method of supporting a gear case for a marine turbine in accordance with the present invention; Fig. 2 is a plan view of a somewhat similar arrangement; Fig. 3 is a perspective view shewing a modified arrangement of flexible support and Fig. 4 is a series of perspective views shewing the support of Fig. 3 dismembered. Fig. 5 is a sectional elevation illustrating another constructional form of flexible support; Fig. 6 is a diagrammatic perspective view illustrating yet another form and Fig. 7 is a perspective view of a gear case illustrating another constructional means of support in accordance with the invention.

Referring now to Fig. 1, the gear case, as indicated in outline by the dot-and-dash lines at 1, is of rectangular form in plan and supports the gear shafts in positions parallel with the short sides. The gear case is connected with the floor on which it is supported at four places substantially midway of its sides at 2 and midway of its ends at 3 and the connections are flexible in directions parallel with the sides and ends respectively. The supporting places 3, 3 are in a line parallel with the axes of the shafts supported in the gear case which is one of the predetermined axes of twist and the supporting places 2, 2 are in a line perpendicular to the line joining the supporting places 3, 3 and located in a plane substantially midway between them. As shewn in Fig. 1 the desired flexibility is obtained by using as connections sections of I-beams 4, 5, the webs of which are comparatively thin and extend in directions perpendicular to the sides and ends of the gear case respectively. The upper flanges of the sections are firmly secured to the gear case and the lower flanges are firmly secured to the floor or foundation. It will be readily seen that under these conditions a twisting movement of the supporting floor around axes either parallel with or perpendicular to the sides of the gear case, these being the predetermined axes of twist one of which is parallel with the axes of the supported shafts, cannot be transmitted to the gear case and consequently cause the gear shafts to be moved from their co-planar or parallel position. It will also be apparent that distortion of the gear case in such a way as to cause an alteration in the co-planar or parallel condition of the shafts will not occur during the operation of chocking-up or inserting wedges between the gear case and the flanges of the sections to which it is bolted.

It will be clear that the lengthening of the connections in the directions perpendicular to the direction of flexibility will not in any way prevent the object of the invention being attained. For example, as shewn in Fig. 2 where 6 is the bottom of the gear case to which the supports are secured, the I-beams shewn in broken lines at 4, 4 and 5, 5 extend from the sides and ends of the gear case and meet at the centre thereof so as to form a cruciform seating. In general, however the central portions of these I-beams will be cut away to afford space for the large gear which usually occupies a central position in the gear case.

Fig. 3 shows diagrammatically a pivotal support which may be employed in place of the sections of I-beams shewn in Fig. 1. The axes of the four pivots will be arranged perpendicular to the sides and ends of the gear case. As clearly seen from Figs. 3 and 4, each support consists of a lower block 7 which is secured to the floor and an upper block 8 secured to the gear case. The blocks are furnished with bearings 9, 10 at their upper and lower surfaces, respectively, adapted to receive a pivot pin 11, a suitable space as shewn at 12 being provided between said bearings and blocks so as to permit rocking of the lower block 7 with reference to the upper block 8. Projecting bosses shewn as continuations of the bearings 9 and 10 are provided over which a clamping ring 13 is slipped and secured in position by means of locking nuts or plates (not shewn in the drawings) attached to the ends of the pivot pins 11 or by cotter pins or other devices commonly used in engineering practice. The rings 13 and the projections which they enclose are designed to be at least as strong as the holding down bolts by which the lower block 7 is secured to the floor.

It will be obvious that the axial length of the pivotal supports may be extended to such dimensions as will afford adequate bearing surface to support the weights and thrusts involved.

In Fig. 5 a spherical seating is diagrammatically illustrated. The bottom 6 of the gear case is secured by bolts 14 to a rocking shoe 15, the lower part of which is formed to a spherical curvature of suitable radius which may be varied with the weight of the gear case to be supported. Said rocking shoe is supported on a bearing plate 16 secured by suitable holding down bolts 17 to the floor. The bearing plate is provided with cantilever spring projections 18 through orifices 19 in which extensions of the bolts 14 may be passed, the orifices 19 being sufficiently large to afford a suitable clearance to said extensions. 20 is an angle plate secured to the floor in a position just clear of the rocking shoe adapted to form a stop and prevent excessive movement or shifting of the shoe on its bearing.

Referring now to Fig. 6 a spring plate support 21 is indicated having four arms the ends of which are secured to the floor and supporting at its centre a boss 22 secured to or forming part of a flange 23 at the bottom of the gear case. A central bolt 24 prevents shifting of the gear case at its supporting points.

It will be evident that the bearing or wearing surfaces in the supports hereinabove described will preferably be made of hardened material, for example chilled castings may be used or other suitable methods may be adopted for hardening the surfaces. The form of the supports may be varied considerably, those shown in the drawings being merely illustrations by way of example.

In supporting gear cases with pinion and gear shafts mounted therein, the supports at each end may be raised on pedestals to the level of the plane of the shafts. An example of this is shown in Fig. 7 where pivoted supports raised on pedestals 25 are shown. The gear shafts to be supported in the gear case 1 are indicated at 26, 27 and 28 and it will be observed that a pivotal bearing co-axial with the central shaft 27 is provided in the top of the pedestal 25, said pedestal being connected by means of the extensions 29, to the bearings of the side shafts 26 and 28. The side supports are inclined, one being seen at 30. It should be clearly understood that the axial bearings of the shafts are provided in and form part of the gear case structure, being cradled in the pivotal support at the top of the pedestal 25. It will be further understood that the bottom of the gear case indicated at the flange 6 will be clear of the floor, the whole apparatus being carried on the pedestals 25 and side supports 30.

The invention is particularly applicable in connection with the supporting of gear cases as it is of special importance for the reason hereinbefore given to avoid twisting such cases in certain directions. It is, however, applicable in supporting other machines or structures and is not limited to the support of marine turbine reduction gears or to supporting the rectangular gear cases for such gears, this particular application, as well as the various constructional methods of carrying out the invention in practice, having been described only by way of example.

We claim as our invention:—

1. The combination with a frame and a foundation member, of tiltable members carried by the foundation member and supporting the frame, said tiltable members being arranged in groups whose axes of tilt are substantially at right angles to each other.

2. The combination with a frame and a foundation member, of flexible web supporting members between the frame and the foundation member and arranged in groups whose axes of flexure are substantially at right angles to each other.

3. The combination with a frame and a foundation member, of tiltable members carried by the foundation member and supporting the frame, said tiltable members having their axes of tilt lying in two planes of symmetry of said frame.

4. The combination with a frame, of tiltable supporting members for the ends of the frame and having aligned axes of tilt and tiltable supporting members for the sides of the frame and having aligned axes of tilt.

5. The combination with a frame, of tiltable supporting members arranged midway of the ends of the frame and having a common axis of tilt and tiltable supporting members arranged midway of the sides of the frame and having a common axis of tilt.

6. The combination with a frame, of supporting I-beam sections for the ends of the frame and having their webs in alignment and supporting I-beam sections for the sides of the frame and having their webs in alignment.

7. The combination with a frame, of supporting I-beam sections arranged midway of the ends of the frame and having their webs in alignment and supporting I-beam sections arranged midway of the sides of the frame and having their webs in alignment.

8. The combination with a reduction gear having a casing, of tiltable supports for the reduction gear arranged below the driven gear thereof and having a common axis of tilt, and tiltable supports arranged below the sides of the casing and having a common axis of tilt.

9. The combination with a reduction gear having a casing, of tiltable supports for the ends of the casing arranged below the driven gear and having a common axis of tilt and tiltable supports for the sides of the casing and having a common axis of tilt which is transverse to the first axis of tilt.

10. The combination with a reduction gear having a casing, supporting I-beam sections for the casing arranged below the driven gear bearings and having their webs in alignment and supporting I-beam sections for the sides of the casing and having their webs in alignment.

In testimony whereof we have hereunto subscribed our names this twenty fourth day of January 1922.

WILLIAM ECCLES.
HENRY LEWIS GUY.